United States Patent
Soma et al.

(10) Patent No.: US 7,340,381 B2
(45) Date of Patent: Mar. 4, 2008

(54) CHARACTERIZATION OF RADIO FREQUENCY (RF) SIGNALS USING WAVELET-BASED PARAMETER EXTRACTION

(75) Inventors: Mani Soma, Seattle, WA (US); Welela Haileselassie, Poughkeepsie, NY (US); Jessica Yan, Bothell, WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 10/665,970

(22) Filed: Sep. 18, 2003

(65) Prior Publication Data

US 2004/0117160 A1 Jun. 17, 2004

Related U.S. Application Data

(60) Provisional application No. 60/415,975, filed on Oct. 4, 2002, provisional application No. 60/416,033, filed on Oct. 4, 2002.

(51) Int. Cl.
*H03F 1/26* (2006.01)
(52) U.S. Cl. .......................... 702/189; 702/79
(58) Field of Classification Search ................ 702/33, 702/36, 56, 57, 66, 69, 70, 71–79, 109, 110, 702/111, 189, 190, 191, 197; 375/346, 348
See application file for complete search history.

(56) References Cited

U.S. PATENT DOCUMENTS 5,990,823 A * 11/1999 Peele et al. .................... 342/90
6,014,412 A * 1/2000 Wiese et al. .................. 375/346
6,175,811 B1 * 1/2001 Tekinay ......................... 702/71
6,295,315 B1 9/2001 Frisch et al.
6,385,543 B1 * 5/2002 Keiser ............................ 702/1
6,937,646 B1 * 8/2005 McCorkle ..................... 375/150

OTHER PUBLICATIONS

D.E. Newland; Journal of vibration and acoustics; Wavelet annalysis of vibration, part 1. Theory; pp. 409-416; vol. 116; 1994.*
Petra Nass, Wikipedia, the free encyclopedia—the wavelet transform, 1999, 6 pages.*
Bouwman, F. et al., "Application of Joint Time-Frequency Analysis in Mixed Signal Testing," Proc. IEEE International Test Conference, pp. 747-756, Washington, DC, 1994.
Yamaguchi, T.J. et al., "Dynamic Testing of ADCs Using Wavelet Transforms," Proc. IEEE International Test Conference, pp. 379-388, Washington, DC, 1997.
Sunter, S. et al., "BIST for Phase-Locked Loops in Digital Applications," Proc. IEEE International Test Conference, pp. 532-540, Sep. 28-30, 1999, Atlantic City, NJ.

(Continued)

*Primary Examiner*—Bryan Bui
(74) *Attorney, Agent, or Firm*—Blakely Sokoloff Taylor & Zafman LLP

(57) ABSTRACT

Embodiments of the present invention apply wavelets to radio frequency (RF) signals to extract specific characteristics (e.g., jitter, phase variations, frequency variations) so that their timing, phase, and frequency components can be characterized. In one embodiment of the present invention, a Haar wavelet is used to extract timing characteristics. In another embodiment, a Morlet wavelet is used to extract phase characteristics. In still another embodiment, a Morlet wavelet is used to extract frequency characteristics.

30 Claims, 11 Drawing Sheets

OTHER PUBLICATIONS

Mason, R. et al., "Mixed Signal DFT at GHz Frequencies," J. of Electronic Testing: Theory and Applications 15, pp. 31-39, 1999.

Roh, J. et al., "Subband Filtering Scheme for Analog and Mixed-Signal Circuit Testing," Proc. IEEE International Test Conference, pp. 221-229, Atlantic City, NJ, 1999.

Yamaguchi, T.J. et al., "Jitter Measurements of a PowerPC Microprocessor Using An Analytic Signal Method," Proc. IEEE International Test Conference, pp. 955-964, Atlantic City, NJ, 2000.

Chan, A.H. et al., "A Synthesizable, Fast and High-Resolution Timing Measurement Device Using a Component-Invariant Vernier Delay Line," Proc. IEEE International Test Conference, pp. 858-867, Baltimore, MD, 2001.

Bhunia, S. et al., "Dynamic Supply Current Testing of Analog Circuits Using Wavelet Transform," Proc. IEEE VLSI Test Symposium, pp. 302-307, Monterey, CA, 2002.

Stenbakken, G.N. et al., "Linear Error Modeling of Analog and Mixed-Signal Devices," Proc. IEEE International Test Conference, pp. 573-581, Nashville, TN, 1991.

Tabatabaei, S. et al, "PLL Jitter BIST Based on Time-to-Digital Converters," IEEE Int. Mixed-Signal Testing Workshop, Montpellier, France, 2000, 12 pages.

\* cited by examiner

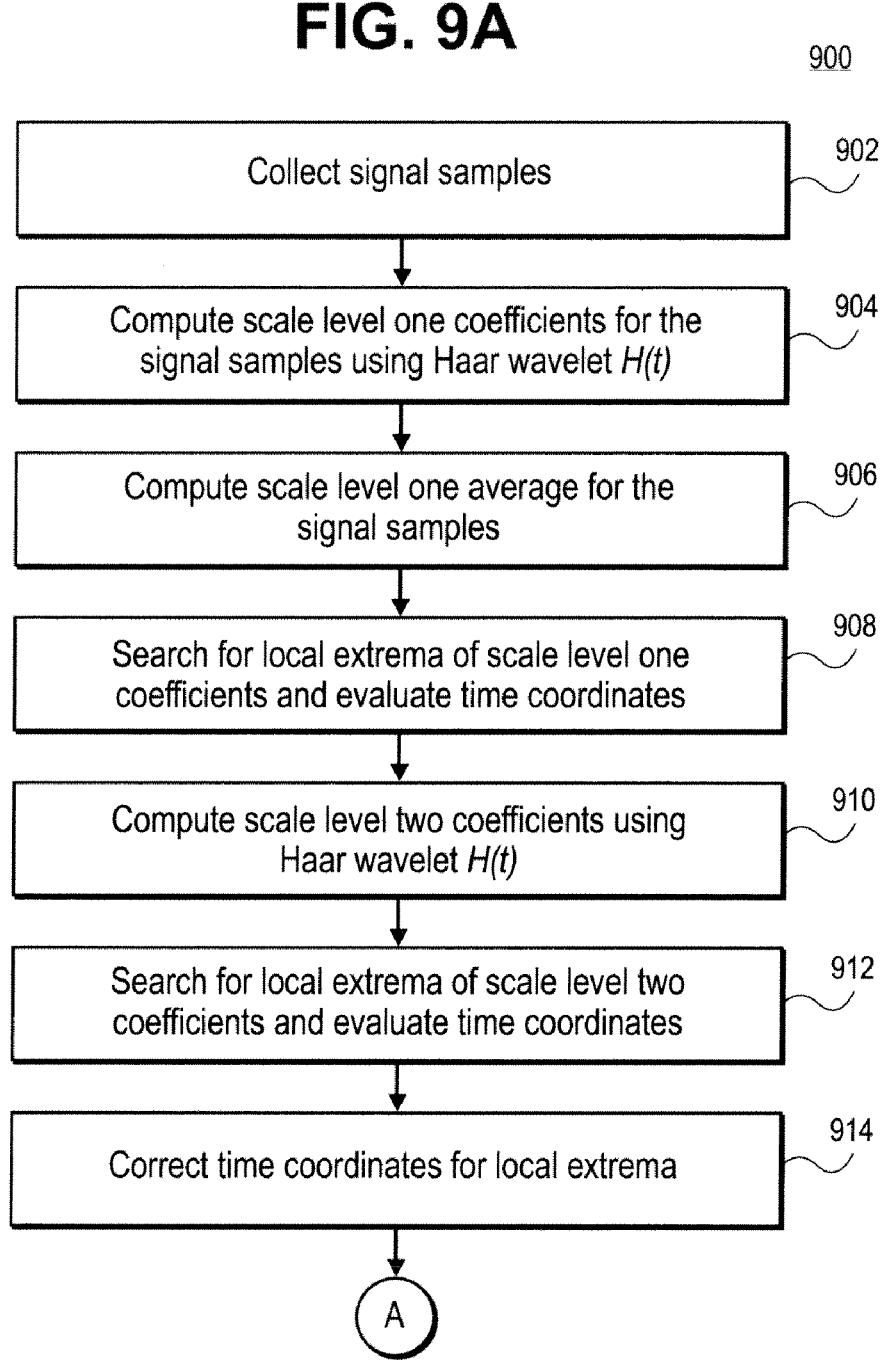

1600

1700

CHARACTERIZATION OF RADIO FREQUENCY (RF) SIGNALS USING WAVELET-BASED PARAMETER EXTRACTION

CROSS-REFERENCE TO RELATED APPLICATIONS

This application claims benefit of priority from U.S. Provisional Application No. 60/415,975 filed Oct. 4, 2002 and from U.S. Provisional Application No. 60/416,033 filed Oct. 4, 2002.

BACKGROUND

1. Field

Embodiments of the present invention relate to system testing and more particularly to testing radio frequency (RF) signals in computer systems and telecommunication systems.

2. Background Information

Timing, frequency, and phase measurements in high-frequency (e.g., radio frequency (RF)) systems such as computer systems and telecommunication systems have received much attention in recent years. Measuring parameters in these systems, which have clocks and data transmission rates in the gigahertz (GHz) range, has proven challenging, however. Nonetheless, accurate estimation of parameters such as signal period, frequency, phase, jitter, edges rates (rise and fall times), etc., is essential for designing such systems as well as for characterizing their operation.

Traditional measurement techniques include bit-error-rate (BER) tests or jitter tests, which are used to characterize errors in the received data of serial data bit streams. BER testing is limited, however, in that it tends to be time consuming and it does not characterize phase variations or frequency variations in the serial data stream during the telecommunication system design stage as well as during operation.

Another technique is the omnipotent fast Fourier transform (FFT) whose implementation provides full signal information in both the amplitude and phase spectra. Clever techniques have been devised to extract specific timing and phase characteristics (e.g., jitter, phase noise) by processing these spectra. The FFT, however, has a critical shortcoming for these specific applications. It loses all time information in the transform computation of the spectra. A frequency change or phase change may be detected in a signal, but the user does not know when the change took place.

This can be particularly troublesome when frequency-hopping techniques called for by wireless telecommunication standards are used to find a possible available channel. In the frequency-hopping case, the FFT spectrum shows several carrier frequencies, but does not show the time windows corresponding to each carrier frequency. Additionally, the FFT computational process can be rather slow.

The Hilbert transform is an alternative technique that may be used to estimate phase and jitter. The Hilbert transform also loses all time information in the transform computation of the spectra, however, and thus is not suitable for estimating phase.

A joint-time frequency analysis using the short-time FFT (SFFT) and a continuous Gaussian-derived wavelet retains time information in the transform computation. Its application requires a large number of samples in each time window to compute the spectrum using the basic FFT algorithm, however.

BRIEF DESCRIPTION OF THE DRAWINGS

In the drawings, like reference numbers generally indicate identical, functionally similar, and/or structurally equivalent elements. The drawing in which an element first appears is indicated by the leftmost digit(s) in the reference number, in which.

DETAILED DESCRIPTION OF THE ILLUSTRATED EMBODIMENTS

Embodiments of the present invention apply wavelets to radio frequency (RF) signals such as telecommunication serial data streams and computer clock signals to extract specific characteristics (e.g., jitter, phase variations, frequency variations) so that their timing, phase, and frequency components can be characterized. In one embodiment of the present invention, a Haar wavelet is used to extract timing components from a clock signal. In another embodiment of the present invention, a Morlet wavelet is used to extract phase components from a radio frequency (RF) signal. In still another embodiment, a Morlet wavelet is used to extract frequency components of an RF signal.

Figure 1:
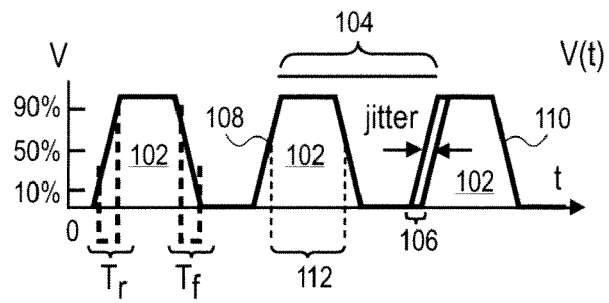
FIG. 1 is a graphical representation of a signal under test according to an embodiment of the present invention.

FIG. 1 is a graphical representation 100 of a signal under test V(t) according to an embodiment of the present invention. The "x" axis represents time and the "y" axis represents voltage. In one embodiment, the signal under test V(t) is a clock signal, such as that found in a computer system. Of course, the signal V(t) may be any digital signal that has analog components. After reading the description herein, persons of ordinary skill in the relevant art will be able to implement embodiments of the present invention for other digital signals with analog components.

The example signal V(t) is a digital signal having several pulses 102. Each pulse 102 includes analog timing parameters such as a signal period 104, jitter 106, a rising edge 108, a falling edge 110, and a pulse width 112.

The signal period 104 is the time between two successive rising edges 108. Alternatively, the signal period 104 is the time between two successive falling edges 110.

The jitter 106 is the deviation in or displacement of parameters of the pulses 102, and may be root-mean-square (RMS) jitter, cycle-to-cycle jitter, and/or peak-to-peak jitter. In the embodiment shown in FIG. 1, the jitter 106 is a deviation in the pulse width 112. In alternative embodiments of the present invention, the jitter 106 is a deviation in the amplitude, phase timing, or other aspect of the pulse 102.

Note that the rising edge 108 and the falling edge 110 do not change instantaneously. The time it takes for the pulse 102 to transition from a logic level "0" to a logic level "1" is the rise time $T_r$. The time it takes for the pulse 102 to transition from a logic level "1" to a logic level "0" is the fall time $T_f$.

The pulse width 112 is the duration of the pulse 102 and is measured at the fifty percent points on the rising edge 108 and the falling edge 110.

In one embodiment of the present invention, a Haar wavelet is applied to the signal under test 100 to extract a timing parameter from an RF signal, such as the signal V(t).

A Haar wavelet is defined as:

$$H(t) = \begin{cases} +1 & 0 \le t < 1/2 \\ -1 & 1/2 \le t < 1 \\ 0 & \text{otherwise} \end{cases} \quad \text{Equation (1)}$$

Figure 2:
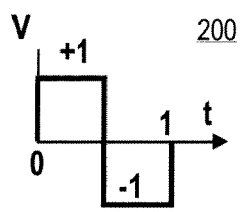
FIG. 2 is a graphical representation of a Haar basic wavelet.

FIG. 2 is a graphical representation 200 of a Haar basic wavelet H(t). The "x" axis represents time and the "y" axis represents voltage. Note that the Haar basic wavelet H(t) transitions from a +1 value to a −1 value over a time t in accordance with its definition.

Figure 3:
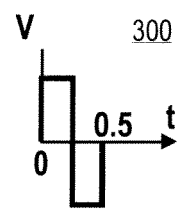
FIG. 3 is a graphical representation of a dilated Haar wavelet.

FIG. 3 is a graphical representation 300 of a dilated Haar wavelet H(2t). The Haar dilated wavelet H(2t) transitions from a +1 value to a −1 value over a time t/2. The Haar dilated wavelet H(2t) is also called the scaled wavelet.

Figure 4:
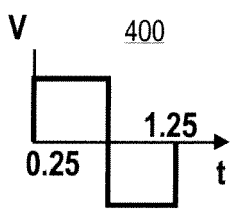
FIG. 4 is a graphical representation of a translated Haar wavelet.

FIG. 4 is a graphical representation 400 of a translated Haar wavelet is H(t−0.25). The Haar translated wavelength H(t−0.25) transitions from a +1 value to a −1 value over a time t shifted by 0.25 t.

A combined dilated and translated representation is $H(2^{-j}t-k)$, in which the Haar basic wavelet is scaled by $2^{-j}$ and translated in time by $k/2^{-j}$. The parameter j is also called the scale level. Note that each wavelet has a finite time duration as compared to the infinite time duration of a sinusoidal signal used as the basis for the FFT. This finite time duration property is important in timing parameter extraction.

Figure 5:
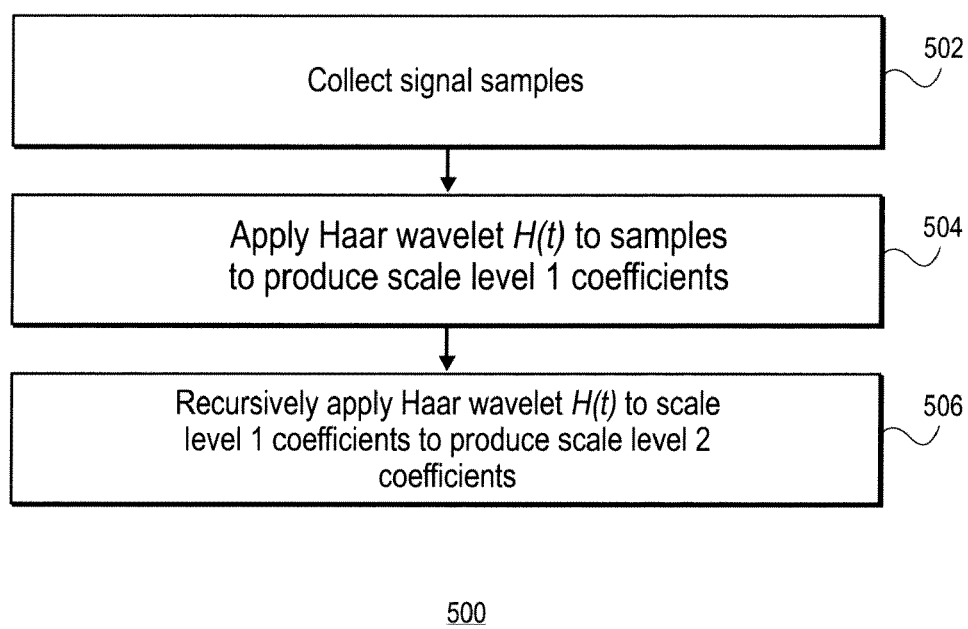
FIG. 5 is a flowchart illustrating a Haar wavelet transform of a signal under test according to an embodiment of the present invention.

FIG. 5 is a flowchart illustrating a process 500 for computing a Haar wavelet transform of the signal V(t) according to an embodiment of the present invention. Of course, this is only an example process and other processes may be used. The process 500 is described as multiple discrete operations performed in turn in a manner that is most helpful in understanding embodiments of the present invention. However, the order in which the operations are described should not be construed to imply that the operations are necessarily order dependent or that they be performed in the order in which they are presented.

In a block 502, a set of samples (V(n), where n=1,N) is collected of the signal V(t) is collected. Samples may be collected using any suitable data acquisition technique. In one embodiment, samples are collected using traditional sampling techniques. In an alternative embodiment, samples are collected using pulse-capturing techniques.

Figure 6:
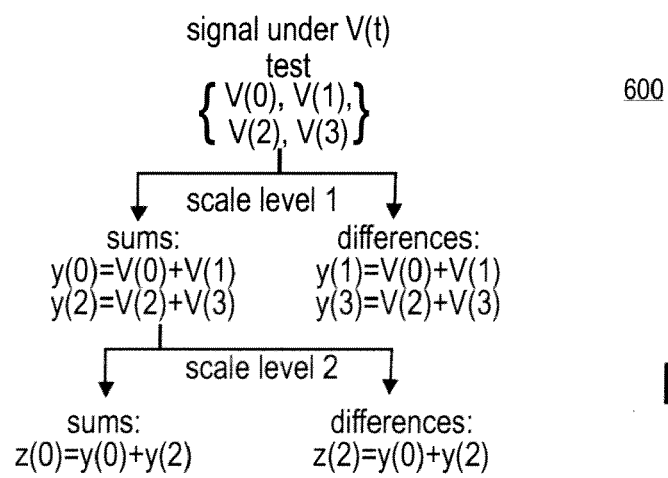
FIG. 6 is a diagram 600 showing the operations of the process 500 according to an embodiment of the present invention.

In one embodiment, there are four samples {V(0), V(1), V(2), V(3)}. Each sample may be a voltage measurement at a time point defined by the sampling clock of frequency $f_s$ (sampling interval $t=1/f_s$). In alternative embodiments, more samples are collected and higher sampling frequencies are used. FIG. 6 is a diagram 600 showing the operations of the process 500 according to an embodiment of the present invention.

In a block 504, the Haar wavelet H(t) is applied to the samples and a Haar wavelet transform is computed. For example, scale level coefficients as pairwise differences of the original samples may be computed and scale level 1 sums as pairwise sums of the original samples may be computed. The first pairwise computation of sums and differences yields scale level 1 coefficients {y(0), y(2)} for the sums and a scale level 1 coefficients {y(1), y(3)} for the differences, as FIG. 6 illustrates.

In a block 506, the Haar wavelet H(t) is recursively applied to the scale level 1 coefficients {y(0), y(2)}. For example, coefficients as pairwise sums of the scale level 1 coefficients {y(0), y(2)} may be computed and coefficients as pairwise differences of the scale level 1 coefficients {y(0), y(2)} may be computed. This second pairwise computation of sums and differences yields scale level 2 coefficients {z(0)} for the sums and scale level 2 coefficients {z(2)} for the differences.

In one embodiment, the resulting set of one sum z(0) and three differences {z(2), y(1), y(3)} may be used to reconstruct the original set {V(0), V(1), V(2), V(3)}.

The differences {z(2), y(1), y(3)} relate to the derivative of the signal V(t). The differences at scale level 1 {y(1), y(3)} are the discrete values of the signal V(t) derivative dV/dt. The discrete values are non-zero only at the rising edges 108 and the falling edges 110, as FIG. 1 illustrates. The timing coordinates of the samples {y(1), y(3)} thus correspond directly to the timing information of the rising edges 108 and the falling edges 110 (i.e., the rise time $T_r$ and the fall time $T_f$).

The sums at scale level 1 {y(0), y(2)} correspond to a smoothing of the original signal V(t), which may be seen more clearly if a divide-by-two operation is incorporated into the sum operation, i.e., y(0) is the average of the two samples {V(0), V(1)} and y(2) is the average of the two samples {V(2), V(3)}. The scale level 2 difference z(2) is the first-order derivative of this smoother signal and also relates to the timing information of the rising edges 108 and the falling edges 110 (i.e., the rise time $T_r$ and the fall time $T_f$).

Intuitively, the differences between analysis of the signal V(t) using the Haar wavelet H(t) and the Fourier sinusoidal basis lead to several interesting observations when both of these tools are used in extracting timing parameters. First, the signal V(t) contains abrupt changes, and so does the Haar wavelet transform of the signal V(t). The Fourier basis, on the other hand, consists of smoothly varying sine waves, thus it makes many more sine waves to approximate the abrupt changes in the original signal V(t). Haar wavelet analysis is a better match than the Fourier analysis, which means fewer wavelets (or fewer coefficients) are necessary for a good approximation of the timing information. Fewer coefficients may result in shorter parameter extraction time than Fourier analysis.

Second, as FIGS. 2, 3, and 4 illustrate, the Haar wavelet H(t) has a finite time extension. This means that the Haar wavelet H(t) can extract local timing information (e.g., information at a rising edge 108 or a falling edge 110) in a more efficient manner. Of course, the Fourier method has better frequency localization and does better in frequency-based tests.

Third, the dilated Haar wavelet H(2t) provides a zoom capability to narrow a region of interest (e.g., a rising edge 108 or a falling edge 110), and the translated wavelet H(t−0.25) provides a moving window capability. These windowing capabilities are inherent in the Haar wavelet H(t), while the Fourier method produces different results depending on the type of windows chosen to process the signal V(t).

A fundamental difference between the a Haar wavelet transform of the signal V(t) according to an embodiment of the present invention and a Fourier transform of the signal V(t) is that as the computation proceeds to higher scale levels, the number of data samples is reduced by a factor of two at each scale level. As FIG. 6 illustrates, the original data set has four samples {V(0), V(1), V(2), V(3)}, the scale level 1 difference has two samples {y(0), y(2)}, and the scale level 2 has one sample z(0). The time interval between samples correspondingly expands by a factor of two as the application of the Haar wavelet H(t) moves up one scale level. Thus the timing information is preserved for each sample and the exact time coordinate for each sample is known. This fact is critical in timing measurement and also is a fundamental difference between a wavelet transform and the regular FFT transform, which loses all timing information.

Figure 7:
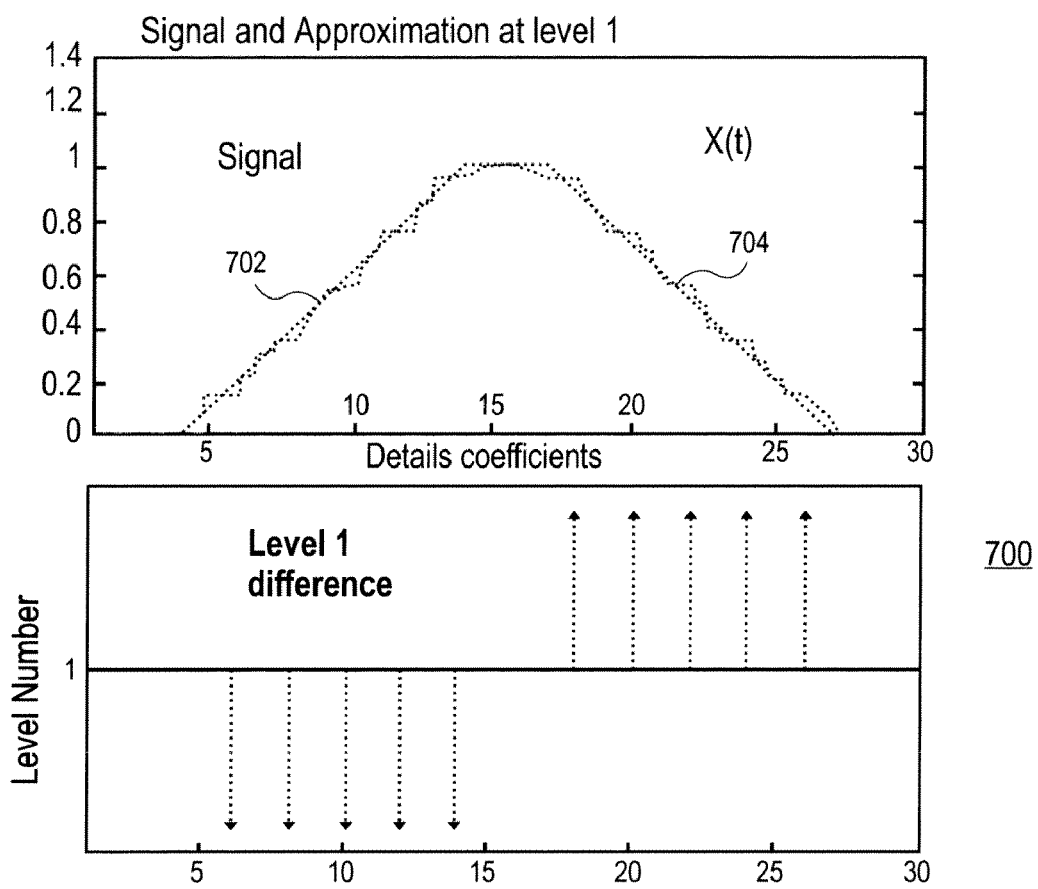
FIG. 7 is a graphical representation of a signal under test and its Haar wavelet transform according to an alternative embodiment of the present invention.

FIG. 7 is a graphical representation 700 of a simple ideal square signal X(t), and the coefficients of the difference computation at a scale level 1 using the Haar wavelet H(t) according to an embodiment of the present invention. The "x" axes represent time. The "y" axis of the signal X(t) represents voltage. The "y" axis of the coefficients represents level number. The signal X(t) has a fixed slope on both the rising edge 702 and the falling edge 704, thus the coefficients have a constant value. Note that the coefficients have opposite signs to the signal derivative dV/dt because the sample difference is calculated as X(n)−X(n+1).

A few observations are in order. The time interval corresponding to the non-zero coefficients is directly correlated to the rise and fall times of the signal X(t). The accuracy of the time interval measurement depends on the sample spacing, at least for first order measurement. The first-order application of the Haar wavelet H(t) (or scale level 1) does not indicate clearly the period of the signal X(t).

Real-life signals, especially in the higher frequency range, are not as clean as the ideal square signal X(t). This fact is advantageous for timing parameter extraction.

Figure 8:
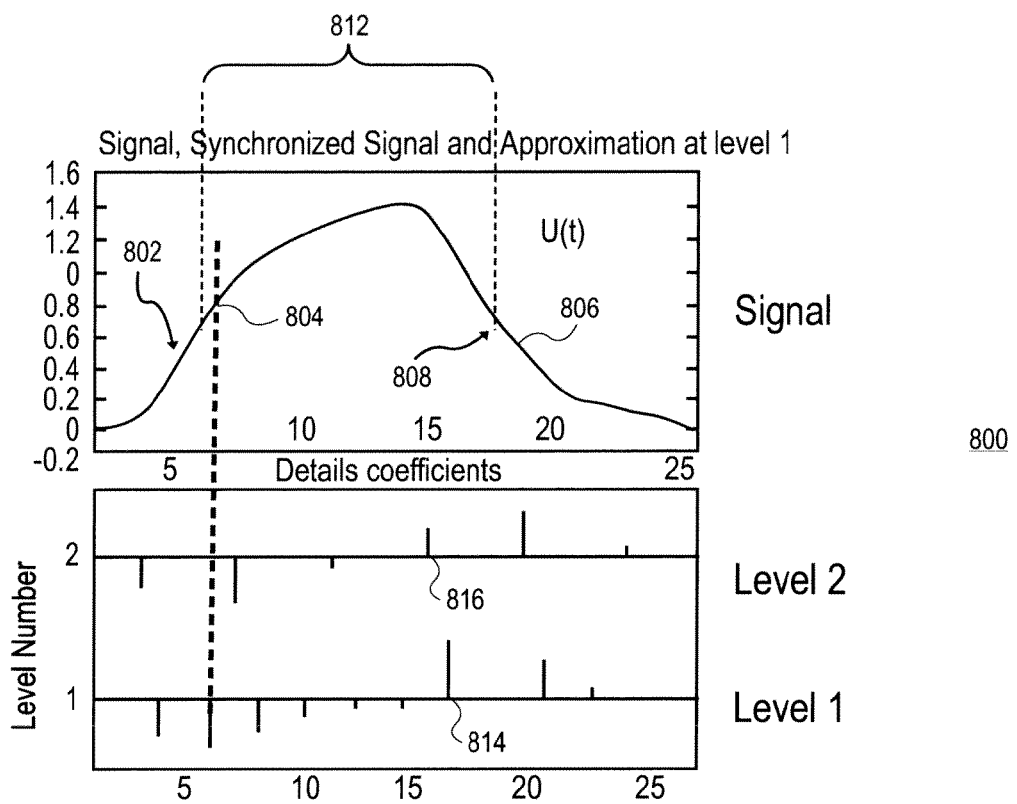
FIG. 8 is a graphical representation of a signal under test and its Haar wavelet transform according to still another of the present invention.

FIG. 8 is a graphical representation 800 of one cycle of a real life 400 MHz clock signal U(t), and the scale level 1 and 2 coefficients resulting from applying the Haar wavelet H(t) according to an embodiment of the present invention. The "x" axes represent time. The "y" axis of the signal U(t) represents voltage. The "y" axis of the coefficients represents level number. The graphical representation 800 shows that signal U(t) includes a rising edge 802, an inflection point 804, an inflection point 806, a falling edge 808, and a pulse width 812. A few observations are in order.

On the rising edge 802, the signal U(t) rises from logic "0" level with increasing slope, and then the slope decreases as the signal U(t) approaches logic "1" level. The first-order derivative thus should increase, arrive at a maximum value, then decrease. This is exactly the behavior of the scale level 1 coefficients (except for the opposite sign as explained above) depicted from FIG. 7. The inflection point 804 illustrated by the vertical dashed line where the derivative or the coefficient has a local maximum is not exactly the 50% point of the waveform (due to noise and other effects) but is a rather good approximation.

The same observation applies for the inflection point 806 for the falling edge 808. The temporal difference between these two inflection points 804 and 806, while not exactly half of the signal period 810, is a good indication of the pulse width 812. The variation in pulse width 812 is directly correlated to jitter in the signal edges 802 and 808.

Note that the computation of scale level 1 coefficients for the signal U(t) produces a maximum at a point 814 whose time coordinate is one-half interval off from the time coordinate of the real maximum, which is at a point 816. This may be due to noise contamination of the signal edges 802 and 808, the discrete sampling times, and the reduction by two of the number of samples. The time interval between the scale level 1 samples is also twice as large as the sampling interval $t_s$, between the original data samples.

To correct for this time expansion and for the possible displacement of the inflection point 804 due to discrete sampling, in one embodiment of the present invention, the scale level 2 computation is used to produce the derivative of a smoother approximation of the original signal U(t). The inflection point based on the scale level 2 computation yields a better estimate of the signal inflection point as follows. If the scale level 2 coefficients have a local maximum to the right of the corresponding scale level 1 maximum, a better estimate of the time coordinate of the inflection point is:

$$t_{inflection} = t_{max\_scale-level-1} + \frac{t_s}{2} \quad \text{Equation (2)}$$

where $t_{max.scale-level-1}$ is the timing coordinate of the maximum of the scale level 1 coefficients and $t_s$ is the sampling interval of the original signal U(t). If the scale level 2 coefficients have a local maximum to the left of the corresponding scale level 1 maximum, a better estimate of the time coordinate of the inflection point is:

$$t_{inflection} = t_{max,scale-level-1} - \frac{t_s}{2} \qquad \text{Equation (3)}$$

Note that the two local maxima at different scale levels do not coincide because the time interval between scale level 2 samples is twice the time interval between scale level 1 samples.

The recursive analysis of the signal U(t) at higher scale levels with more compressed Haar wavelet pulse widths can produce better estimated values if necessary. After reading the description herein, a person of ordinary skill in the relevant art would readily recognize how to implement the inflection point correction method to obtain better estimates of inflection points for signals under test.

Figure 9B:
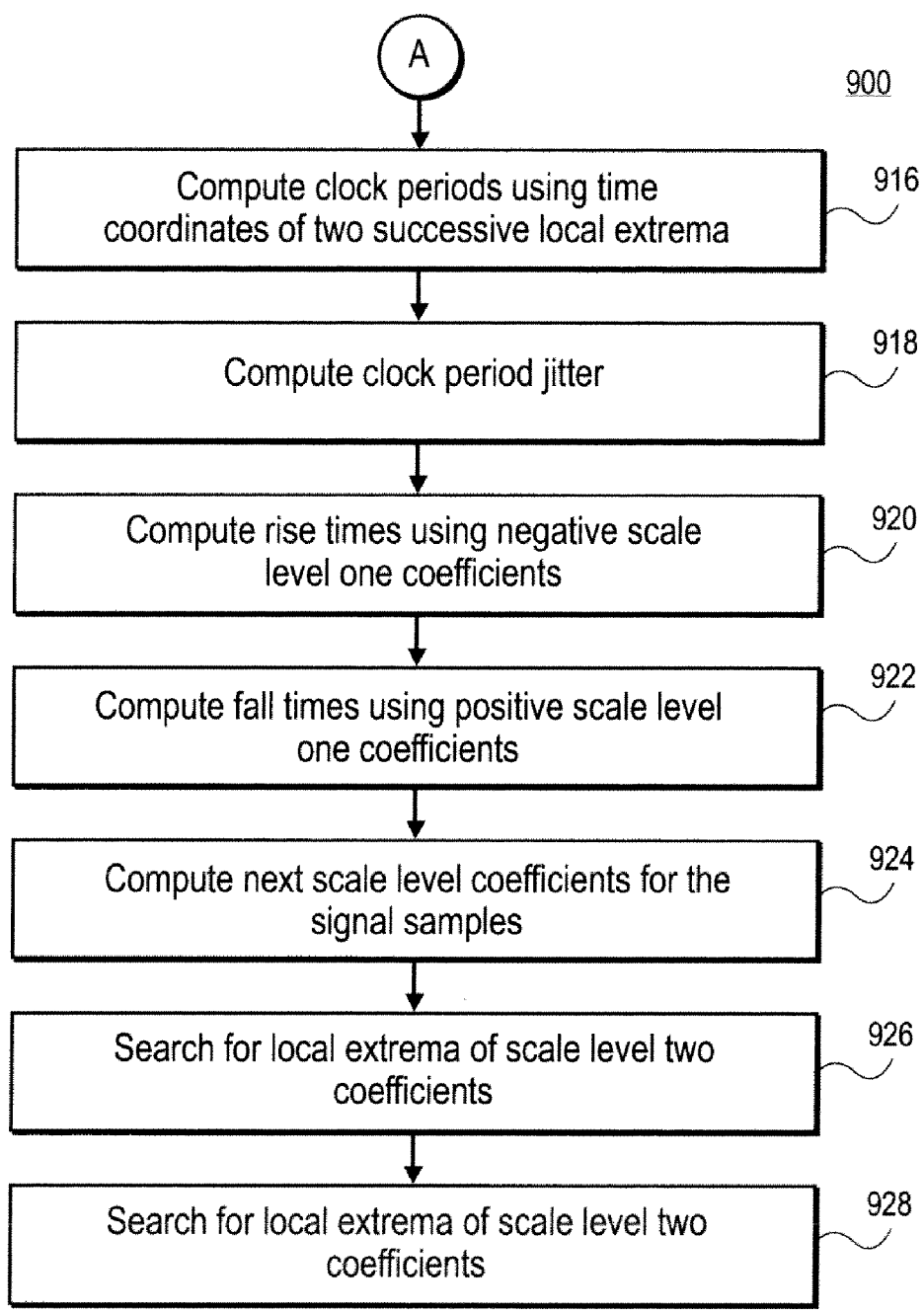
FIG. 9 is a flowchart illustrating an approach to extracting timing parameters according to another embodiment of the present invention.
Figure 10:
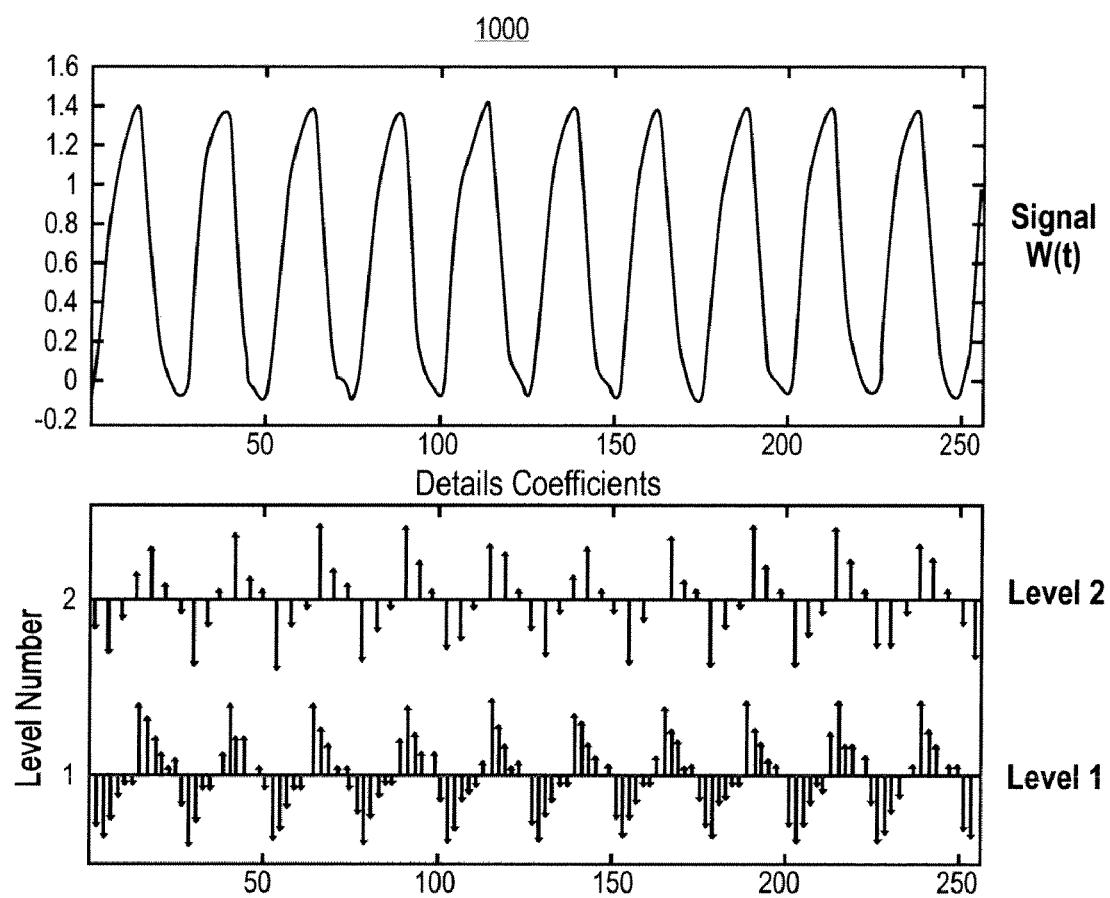
FIG. 10 is a graphical representation of a signal under test and its Haar wavelet transform according to an embodiment of the present invention.

FIGS. 9A and 9B illustrate a flowchart of a process 900 for extracting timing information from a signal under test W(t) using a Haar wavelet H(t) according to an embodiment of the present invention. FIG. 10 is a graphical representation 1000 of a signal W(t) and the resulting scale level 1 and 2 coefficients according to an embodiment of the present invention. The signal under test W(t) may be a four hundred megahertz (MHz) clock signal commonly used in microprocessors. The Haar wavelet H(t) may be used to extract jitter from the signal under test W(t). FIG. 10 shows ten cycles (approximately 4.8K clock cycles in total) of the signal under of test W(t) (for clarity), with the coefficients for scale level 1 and 2 in the same format as FIGS. 7 and 8.

The process 900 will be described as multiple discrete operations performed in turn in a manner that is most helpful in understanding embodiments of the present invention. However, the order in which the operations are described should not be construed to imply that the operations are necessarily order dependent or that they be performed in the order in which they are presented. The operations in the process 900 may be implemented in any suitable computational tool, such as ATE. Of course, this is only an example process and other processes may be used.

In a block 902, a set of samples is collected from the signal under test using any suitable data acquisition technique. In one embodiment, the signal under test W(t) is sampled at ten GHz by a Tektronix TDS694C oscilloscope using an 8-bit analog-to-digital converter (ADC).

In a block 904, the set of scale level 1 coefficients are computed as pairwise differences of the samples.

In a block 906, the set of scale level one averages are computed as pairwise averages of the samples.

In a block 908, local extrema (i.e., maxima and minima) of scale level one coefficients are searched for and their time coordinates are evaluated.

In a block 910, the set of scale level two coefficients are computed as pairwise differences of the scale level one averages.

In a block 912, local extrema of scale level two coefficients are searched for and their time coordinates are evaluated.

In a block 914, time coordinates for local extrema are corrected. In one embodiment of the present invention, the time coordinates may be computed using Equation (2) or Equation (3).

In a block 916, the set of clock periods $\{T_n\}$ may be computed from the timing coordinates of two successive extrema points (e.g., $t_{inf,rise}$ for the rising edge of the signal under test and $t_{inf,fall}$ for the falling edge of the signal under test using the following equation:

$$T_n = 2*(t_{inf,fall} - t_{inf,rise}) \qquad \text{Equation (4)}$$

In an alternative embodiment, the set of clock periods $T_n$ are computed using the difference between two successive rising inflection points.

In a block 918, clock period jitter may be computed using the values for the set of clock periods $T_n$. In one embodiment, clock period jitter statistics (RMS jitter, cycle-to-cycle jitter, and peak-to-peak jitter) may be generated from the set of clock periods $T_n$.

In a block 920, the set of rise times $\{T_r\}$ are computed as intervals during which the scale level 1 coefficients are negative. To avoid spurious results due to noise near ground or $V_{DD}$, some non-zero threshold (e.g., coefficient<−10% of maximum coefficient) may be used. In one embodiment, the mean rise time and other rise time statistics may be computed from the set of rise times $\{T_r\}$.

In a block 922, the set of rise times $\{T_f\}$ are computed as intervals during which the scale level 1 coefficients are positive. To avoid spurious results due to noise near ground or $V_{DD}$, some non-zero threshold (e.g., coefficient>+10% of maximum coefficient) may be used. In one embodiment, the mean rise time and other fall time statistics may be computed from the set of fall times $\{T_f\}$.

In a block 924, the Haar wavelet analysis is extended to scale level 3 or higher and the differences in the estimated values of the timing parameters are computed. If the differences are within accepted experimental errors (e.g., 5%), the level of computation may stop here and the timing parameter extraction is thus completed.

Given a sample size of N, the Haar wavelet analysis has been demonstrated to take O(N) time to produce the detail coefficients. Note that the Haar wavelet computation is particularly simple in that it involves only additions, subtractions, and divisions by two. The timing parameter extraction process blocks 902-928 also take O(N) computations. Thus the entire process 900 for extracting timing parameters from data samples is O(N), which is significantly faster than the most efficient implementation of the FFT, which uses O(logN) computations. The entire process 900 also is significantly faster than the discrete Walsh-Hardamard transform that uses O(N $\log_2$N) computations.

Table 1 below shows the results of using only two scale levels and as applied to three sample sizes: 512, 16K, and 120K to study the accuracy of the process 900 as function of sample size and as compared with the Hilbert transformation $\Delta\phi$ method and the time-interval analyzer (TIA) method as measured by a Wavecrest DTS2077 instrument. Note that the TIA and the $\Delta\phi$ methods use zero-crossing events (the number in the column labeled "Number of events/samples") while the wavelet method uses the number of samples. For this specific experiment, one cycle of a clock signal corresponds to two zero crossing events and about twenty-five samples.

TABLE 1

Jitter Estimation Results and Comparison

| Method | Number of events/samples | $J_{RMS}$ | $J_{PP}$ |
|---|---|---|---|
| TIA | 10,000 zero-crossings (or 125,000 samples) | 7.72 ps | 48.2 ps |
| $\Delta\phi$ Hilbert | 4,525 zero-crossings (or 56,563 samples) | 7.44 ps | 62.3 ps |

TABLE 1-continued

Jitter Estimation Results and Comparison

| Method | Number of events/samples | $J_{RMS}$ | $J_{PP}$ |
|---|---|---|---|
| Discrete Haar Wavelet | 512 samples | 8.18 ps | 35.1 ps |
| | 16,448 samples | 7.50 ps | 58.5 ps |
| | 120,000 samples | 7.47 ps | 65.2 ps |

The standard deviation for the measurements by the wavelet method in Table 1 is approximately 5% of the values reported.

The RMS period jitter ($J_{RMS}$) estimates are reasonably close between the three measurement methods. Even with a very small sample size of 512 (about twenty cycles of the clock signal W(t)), using the Haar wavelet method according to an embodiment of the present invention (e.g., the method 900) produces $J_{RMS}$=8.17 ps, within ten percent difference of the results measured by the other two methods. At larger sample sizes (16K and 120K), the difference between all three methods is negligible (less than five percent). Thus using the Haar wavelet method according to an embodiment of the present invention potentially can be used with smaller sample sizes to speed up the computation, in addition to its advantage of O(N) processing complexity.

The peak-to-peak jitter ($J_{pp}$) estimates are more interesting in their differences. It is well known that $J_{pp}$ is a monotonically increasing function of zero-crossing events or sample sizes and this fact is reflected in the measured values. Using the Haar wavelet method according to an embodiment of the present invention, at sample sizes of 16K and higher, produces $J_{pp}$ values closer to the $\Delta\phi$ method (within six percent) and farther from the TIA method (up to thirty-five percent) with similar sample sizes. T. J. Yamaguchi, et al., "Jitter Measurements of a Power PC Microprocessor Using An Analytic Signal Method," Proc. IEEE International Test Conference, pp. 955-965, Atlantic City, N.J., 2000, has discussed this large difference in $J_{pp}$ measurements between the $\Delta\phi$ method and the TIA method based on the non-zero dead time jitter estimator built into the TIA method. The same discussion applies to the difference observed herein.

In embodiments described above, a Haar wavelet is used to extract timing characteristics from RF signals. In other embodiments of the present invention, a Morlet wavelet $\Psi((t-\tau)/a)$ is used to extract phase and frequency characteristics from a RF signals. The Morlet wavelet transform of a signal under test s(t) is defined by:

$$S(a, \tau) = \frac{1}{\sqrt{a}} \int s(t) e^{-\left(\frac{t-\tau}{a}\right)^2/2} e^{j\omega_0\left(\frac{t-\tau}{a}\right)} dt \quad \text{Equation (5)}$$

where a is the scale and $\tau$ is the translation of the transforming wavelet along the time axis. The Morlet wavelet transform can be understood better when the integral is interpreted as the measurement of the similarity or cross-correlation between the signal under test s(t) and the Morlet basic wavelet:

$$\Psi((t-\tau)/a) \quad \text{Equation (6)}$$

corresponding to the Morlet basic wavelet as a real time function:

$$\Psi(t) = e^{-t^2/2} e^{j\omega_0 t} \quad \text{Equation (7)}$$

together with the Morlet basic wavelet as function of frequency i.e., its spectrum):

$$\Psi(\omega) = \sqrt{2\pi} e^{-(\omega-\omega_0)^2/2} \quad \text{Equation (8)}$$

The translation parameter $\tau$ in Equation (6) provides a means to slide the basic template of the Morlet wavelet to a different time point for analysis, similar to the regular convolution or cross-correlation integral. The scale parameter a in Equation (6) provides a means to compress or expand the Morlet wavelet in time. A lower value of a compresses the Morlet wavelet, making it more suitable to correlate with high-frequency signals. A higher value of a expands the Morlet wavelet, making it more suitable to correlate with low-frequency signals.

Figure 11:
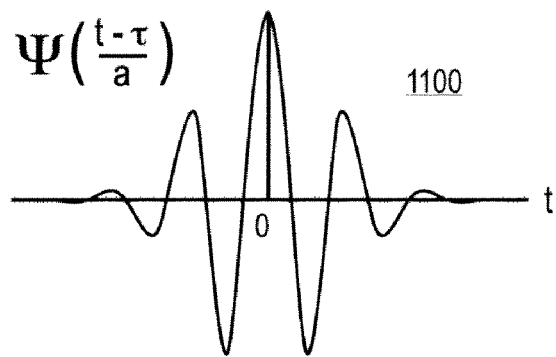
FIG. 11 is a graphical representation of a Morlet basic wavelet as a real time function.
Figure 12:
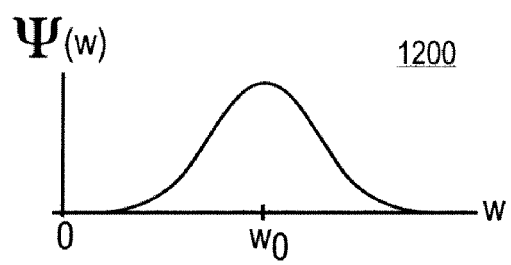
FIG. 12 is a graphical representation of a Morlet basic wavelet as a spectrum.

FIG. 11 is a graphical representation 1100 of a Morlet basic wavelet $\Psi((t-\tau)/a)$ as a real time function (without the scale a and the translation parameter $\tau$). FIG. 12 is a graphical representation 1200 of a Morlet basic wavelet as a function of frequency $\Psi(\omega)$, where $\omega_0$ is center frequency.

Two fundamental characteristics of the Morlet wavelet deserve to be mentioned explicitly. First, the Morlet wavelet implemented according to an embodiment of the present invention has finite time duration, as illustrated in FIG. 11, due to the fast decaying characteristic of the exponential factor $e^{-t^2/2}$. This is in contrast to the sine wave basis of the Fourier transform, which has infinite time duration. This property helps with the time localization of a measured property (e.g., phase components, frequency components) of the signal under test s(t).

Second, the Morlet wavelet implemented according to embodiments of the present invention also has finite frequency duration, as illustrated in FIG. 12, centered about the frequency $\omega_0$. This frequency window may be understood as a Gaussian filter to isolate the frequency components of the signal under test s(t) corresponding to the time window under study.

The Morlet wavelet defined in equation (5) computes the cross-correlation between the signal under test S(t) and the Morlet basic wavelets in equations (7) and (8). In contrast to the Fourier transform, which maps a time-domain signal into a frequency-domain function, the Morlet transform maps a time-domain signal into a two-dimensional function S(a, $\tau$), in which time is still preserved while the frequency information is computed for a specific time window. This is exactly what is needed to measure phase and frequency changes as functions of time. The transform is also quite flexible in that various values of the scale parameters a and the time translation $\tau$ can be used to look for a specific feature of the signal under test.

The process used to detect phase variations and frequency variations using the Morlet wavelet $\Psi((t-\tau)/a)$ as functions of time can be further explained by considering the behavior of the basis function in Equations (7) and (8) for various values of the scale a and the time translation parameter $\tau$. As a becomes smaller, the function $$\Psi\left(\frac{t-\tau}{a}\right)$$

becomes larger in magnitude and narrower in time, and in the limit of a approaching zero, the function $$\Psi\left(\frac{t-\tau}{a}\right)$$

behaves like the delta function δ(t−τ), which seeks out one specific value of the original signal at the time τ. This property is used to detect phase changes (or frequency changes) in the signal under test over a short time window.

For small non-zero values of the scale parameter a, the basis function $$\Psi\left(\frac{t-\tau}{a}\right)$$

is compressed in time, and its spectrum, illustrated in FIG. 12, becomes a wider Gaussian window. This Gaussian window extracts the frequency contents of the signal under test S(t) at the analysis time τ. Thus the transform result S(a, τ) for a given scale value shows the frequency contents of the signal under test S(t) as a function of time, which is exactly the desired analysis of an RF signal in a frequency-hopping environment.

Figure 13:
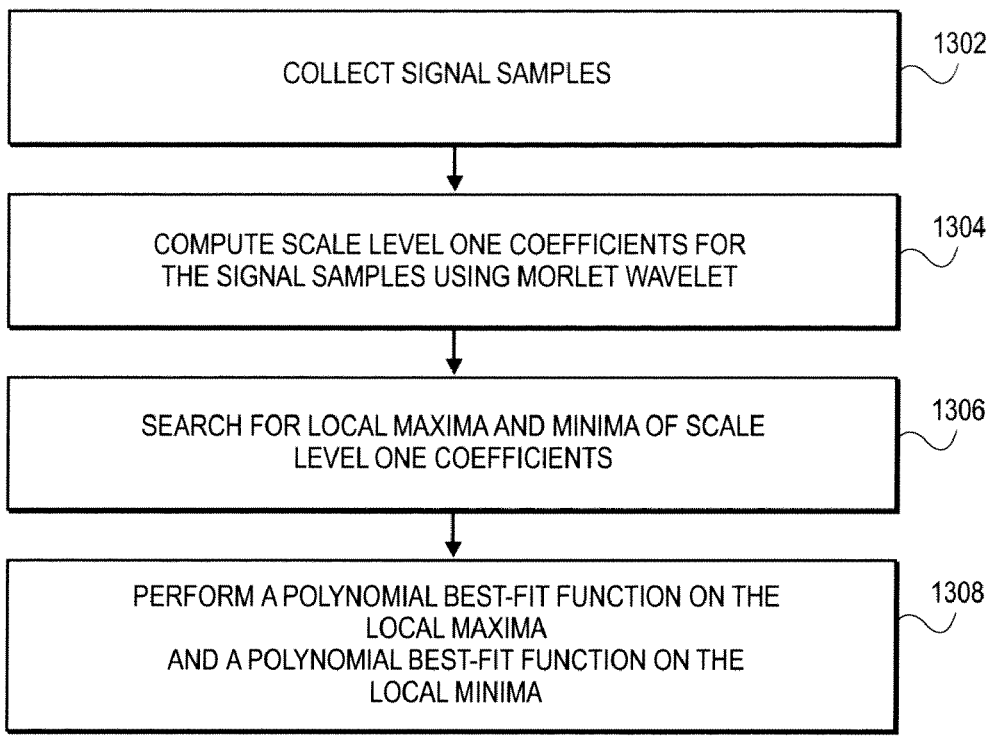
FIG. 13 is a graphical representation of a signal under test according to an embodiment of the present invention.

FIG. 13 is a flowchart illustrating a process 1300 for extracting phase variations and/or frequency variations from a signal under test using the Morlet wavelet $$\Psi\left(\frac{t-\tau}{a}\right)$$

according to an embodiment of the present invention.

The process 1300 will be described as multiple discrete operations performed in turn in a manner that is most helpful in understanding embodiments of the present invention. However, the order in which the operations are described should not be construed to imply that the operations are necessarily order dependent or that they be performed in the order in which they are presented. The operations in the process 1300 may be implemented in any suitable computational tool. Of course, this is only an example process and other processes may be used.

In a block 1302, a set of samples is collected from the signal under test using any suitable data acquisition technique. Samples may be collected using automated test equipment (ATE), oscilloscopes, or other suitable data acquisition technique.

In one embodiment of the present invention, each sample is a voltage measurement at a time point defined by the sampling clock of frequency $f_s$ (sampling interval $t_s=1/f_s$). Of course, greater the number of samples and higher sampling frequencies offer better approximations.

In a block 1304, the set of scale level 1 coefficients are computed for the samples.

In a block 1306, local extrema (i.e., maxima and minima) of scale level 1 coefficients are searched for. Recall from above that as a becomes smaller, the function $$\Psi\left(\frac{t-\tau}{a}\right)$$

becomes larger in magnitude and narrower in time, and in the limit of a approaching zero, the function $$\Psi\left(\frac{t-\tau}{a}\right)$$

behaves like the delta function δ(t−τ). This can be used to find the specific local maxima and minima of the original signal at the time τ.

In a block 1308, a polynomial best-fit function is performed for the local maxima and a polynomial best-fit function is performed for the local minima.

Figure 14:
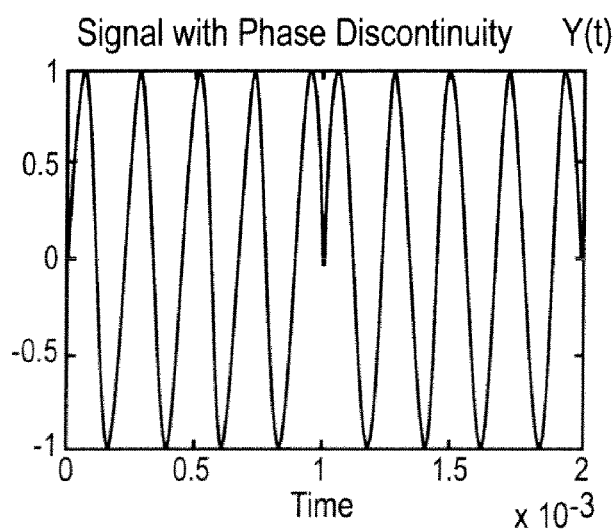
FIG. 14 is a flowchart of illustrating a Morlet wavelet transform of a signal under test according to an embodiment of the present invention.
Figure 15:
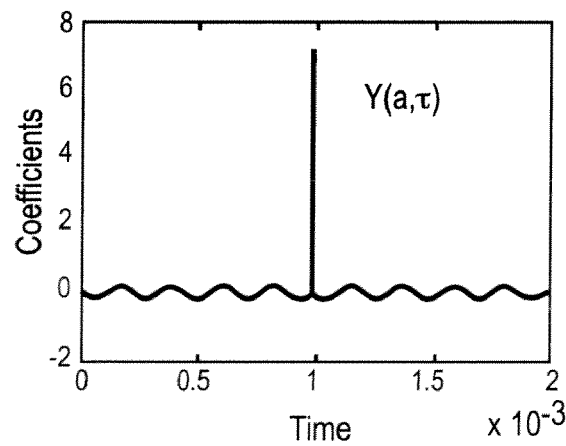
FIG. 15 is a Morlet wavelet transform of the signal under test depicted in FIG. 13 according to an embodiment of the present invention.

In one embodiment, the example process 1300 is implemented for a signal under test that has a phase discontinuity to extract the phase discontinuity. FIG. 14 is a graphical representation 1400 illustrating an example of such a signal under test Y(t) and FIG. 15 is a graphical representation 1500 of the Morlet wavelet transform coefficients of the signal under test according to an embodiment of the present invention.

FIG. 14 shows that the example signal under test Y(t) is a continuous sine signal with a phase discontinuity at time t=1 ns (i.e., $10^{-9}$ s). The best-fit envelopes are constants with time, except for several non-constant values of the phase discontinuities at t=1 ns. The time locations of the non-constant values are the time points of phase discontinuities in the signal under test Y(t) (i.e., at t=1 ns), as FIG. 15 illustrates. Also, the magnitudes of the phase discontinuities are proportional to the non-constant values.

Figure 16:
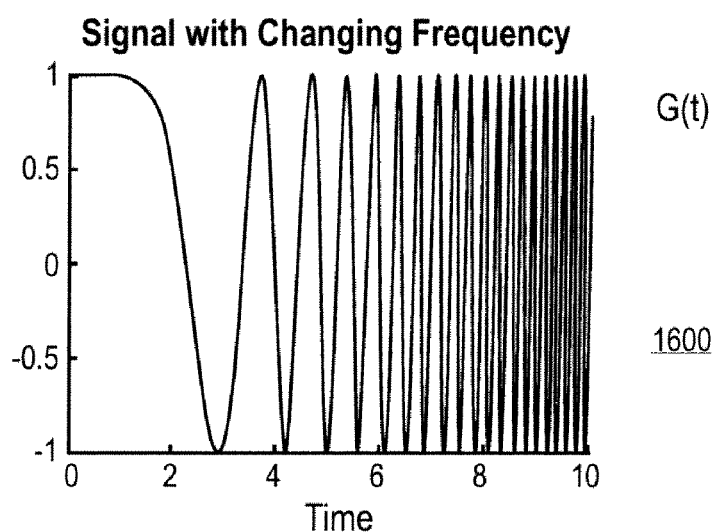
FIG. 16 is a graphical representation of a signal under test according to an alternative embodiment of the present invention.

In an alternative embodiment, the example process 1300 is implemented for a signal under test that has a frequency variation to extract the frequency variation. FIG. 16 is a graphical representation 1600 illustrating an example of such a signal under test G(t) and FIG. 17 is a graphical representation 1700 of the Morlet wavelet transform coefficients with the best-fit envelopes of the signal under test G(t) according to an embodiment of the present invention.

The example signal under test G(t) is a sine signal whose frequency increases as a function of time. In this embodiment, the coefficients vary as functions of time. The best-fit polynomial function is the frequency variation as a function of time in the original signal under test G(t). The coefficients and best-fit envelopes clearly reflect the correct time variation of the signal under test G(t) frequency. Moreover, the coefficient envelope can be used to construct an expression of the frequency of the signal under test G(t) as a function of time, which in this case is a quadratic function f(t)=5.6 GHz+at². Note that in this embodiment, frequency and phase are considered interchangeably, similar to the case of phase modulation (PM) and frequency modulation (FM) in communication systems.

Figure 17:
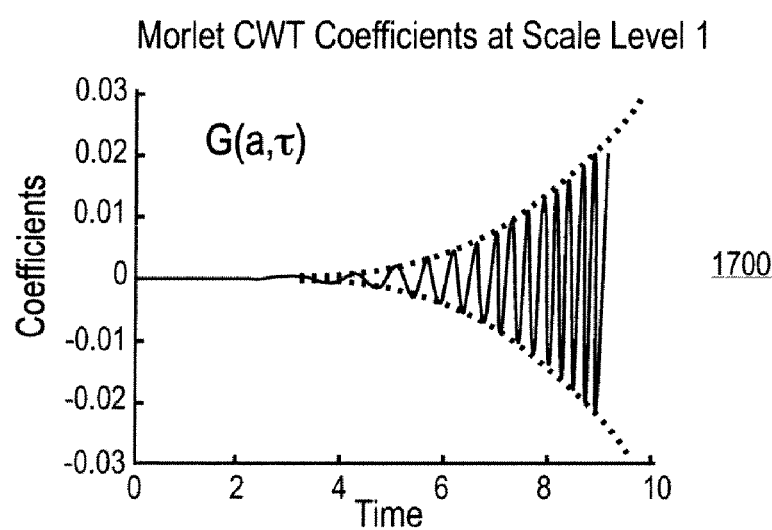
FIG. 17 is a Morlet wavelet transform of the signal under test depicted in FIG. 16 according to an embodiment of the present invention.

The example embodiment illustrated in FIGS. 16 and 17 is similar to a pulse frequency-modulated (PFM) signal. However, the Morlet transform is very sensitive to sharp edges (sudden phase changes), and the output contains information related to these edges in addition to the frequency modulation information. Realistic pulses actually do not have sharp edges, especially at high frequencies. The direct application of the Morlet analysis to high-frequency clock signals thus is quite straightforward.

Figure 18:
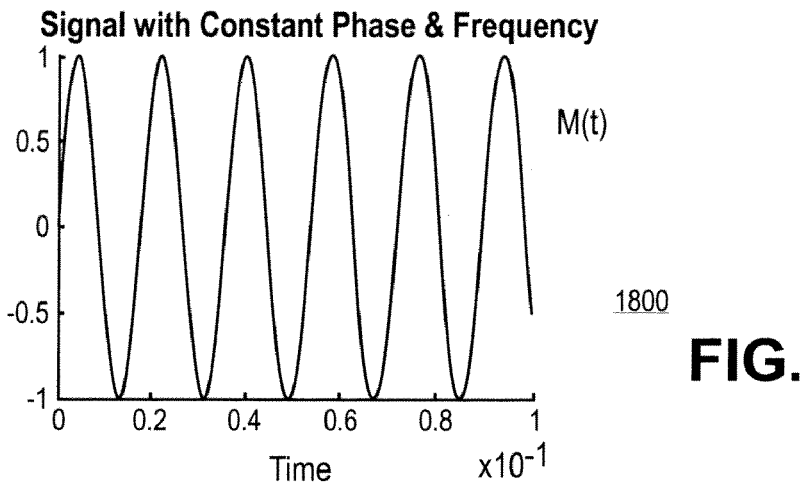
FIG. 18 is a graphical representation of a signal under test according to an embodiment of the present invention.
Figure 19:
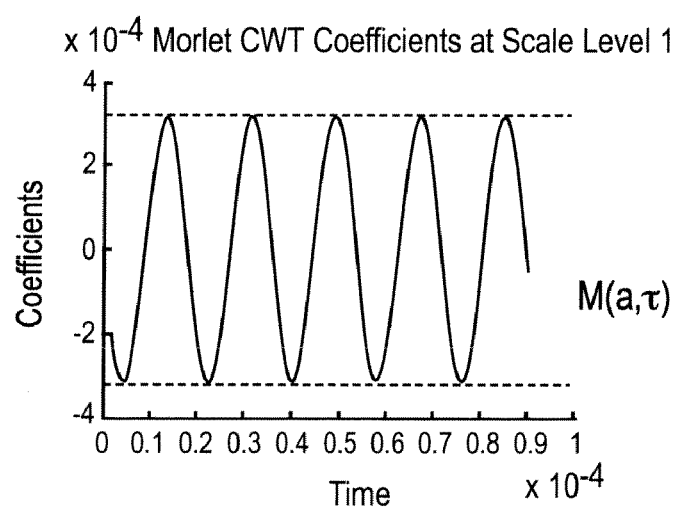
FIG. 19 is a Morlet wavelet transform of the signal under test depicted in FIG. 18 according to an embodiment of the present invention.

In still another embodiment, the example process 1300 is implemented for a signal under test that has constant phase and frequency. FIG. 18 is a graphical representation 1800 illustrating an example of such a signal under test M(t) and FIG. 19 is a graphical representation 1900 showing the Morlet wavelet transform coefficients with the best-fit envelopes of the signal under test G(t) according to an embodiment of the present invention.

The signal under test M(t) is a continuous sine signal without any change in phase or frequency. The example frequency is 5.6 GHz. The best-fit envelope for the local maxima is a horizontal line with zero slope and the same observation applies for the best-fit envelope of the local minima. This result confirms the fact that the original signal under test M(t) has no phase or frequency variations in the time window under test.

Figure 20:
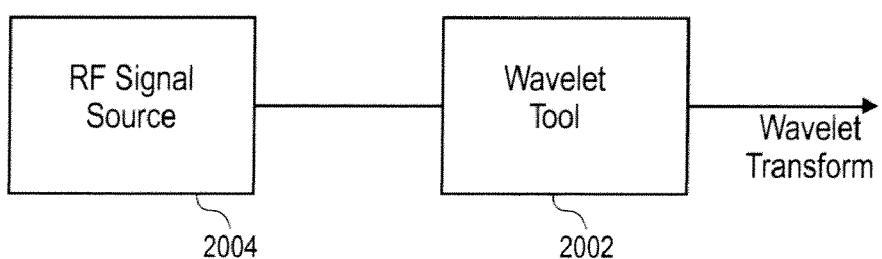
FIG. 20 is a high-level block diagram of a system suitable for implementing embodiments of the present invention.

FIG. 20 is a high-level block diagram of a system 2000 suitable for implementing embodiments of the present invention. The system 2000 includes a wavelet tool 2002 coupled to a radio frequency (RF) signal source 2004. The RF signal source 2004 provides an RF signal to the wavelet tool 2002. The wavelet tool 2002 applies a wavelet to the RF signal and generates a wavelet transform of the RF signal.

In one embodiment, the wavelet tool 2002 applies a Haar wavelet to the RF signal. In this embodiment, the wavelet tool 2002 may be used to extract timing parameters such as jitter, period, rise and fall times, etc., from the RF signal.

In an alternative embodiment, the wavelet tool 2002 applies a Morlet wavelet to the RF signal. In this embodiment, the wavelet tool 2002 may be used to extract phase and/or frequency parameters from the RF signal.

In one embodiment, the RF signal source 2004 provides a telecommunication signal, such as an RF signal in a wireless telecommunication system. In an alternative embodiment, the RF signal source 2004 provides a clock signal, such as an RF clock signal in a computer system.

There are several features and advantages of applying a wavelet to an RF signal or a clock signal according to embodiments of the present invention. One is ease of data acquisition from the signal to be measured. As for the example algorithms described in FIG. 5 and FIG. 9, there is no specific sampling technique even though, in common with other methods such as FFT, Hilbert transformation, and TIA, a large sample size and a small sampling interval are factors in the accuracy of the parameter extraction.

It should be noted that the Haar wavelet described herein with respect to embodiments of the present invention is a discrete wavelet while there are other continuous-time wavelets suitable for test sampling issues. Recent work has been done on coherent under-sampling methods for mixed-signal test and provide an alternative to reduce the sampling requirement since it is clear that signal frequencies are increasing too fast for any sampler to keep up.

One issue of concern in understanding is the coherency between samples collected in different signal cycles, thus there will be an impact on the measurement of the signal timing parameters. If the under-sampling method can guarantee timing coherency between samples despite the jitter in the sampling clock and the signal under test, the set of samples collected by under-sampling can be analyzed using the example algorithms described in FIG. 5 and FIG. 9.

As for the algorithm described in FIG. 13, there is an assumption that the signals under test are sampled, even though the mathematical theory itself does not require sampling. Sampling of signals such as the example signals described herein is very costly (expensive external instrumentation, longer test time) and may be preformed in characterization testing but may not be possible in production testing.

It is noted that for phase and/or frequency extraction testing described herein, the signal under test does not have to be sampled at Nyquist rate (required only for full signal reconstruction). A lower sampling frequency is sufficient. The timing coherency in under-sampling of a high-frequency signal is a concern, however, especially if any lack of coherence or jitter in edge placement could reflect in the erroneous conclusion of larger phase variations in the signal under test.

A direct implementation of the integral in Equation (5) is only possible in analog signal processing using some form of filter or filter banks on chip, or direct analog data acquisition and integration on an ATE. Thus if an alternative to sampling is desirable, the challenge remains in the design of on-chip circuits or ATE electronics to acquire and process the waveform data.

A second advantage of embodiments of the present invention is short measurement time or equivalently small number of samples and/or faster parameter extraction. The wavelet method does well in this area, even if sampling is employed.

As for the example algorithms described in FIG. 5 and FIG. 9, computation of the Haar wavelet transform does not require a large number of samples, and its processing time of O(N) is the minimal theoretically possible of all signal-processing methods. Note that continuous-time wavelets might need a longer time to extract the parameters since the decomposition coefficients are evaluated by integrals, not by simple arithmetic equations.

As for the example algorithm described in FIG. 13, a Morlet wavelet transform of a signal under test as represented in Equation (5) can be discretized and processed via the fast discrete wavelet transform described in G. Strang and T. Nguyen, *Wavelets and Filter Banks*, Wellesley-Cambridge Press, 1996, (similar to the discrete FFT). The Morlet wavelet transform does not require a large number of samples and its processing time of O(N) is the minimal theoretically possible of all signal-processing methods. The search algorithm takes O(lgN) and the curve-fitting algorithm takes O(N). Thus the total computational complexity is still O(N). The flexibility in changing the scale parameter and the time translation parameter makes it possible to search for a specific signal feature (in this case phase or frequency variations) without having to repeat the measurements over many time windows.

A third advantage is intelligent use of test resources between on-chip facilities and external instrument-based facilities. The wavelet methods, be they discrete or continuous, may be implemented within an instrument (e.g. any bench-top test instrument such as oscilloscope, Wavecrest signal integrity analyzer, etc.) or an ATE as a signal-processing algorithm operating on sampled data.

The Haar wavelet implementation (e.g., FIGS. 5 and 9) described herein may be implemented on-chip since the transform computation only needs three simple operations: addition, subtraction, and division by two. The division by two is not a part of the original transform (Equation (5)) but is used to calculate the average instead of the sum of two consecutive samples. This average corresponds to a smoothing operation of a low-pass filter of the original signal under test.

With an on-chip sampler (maybe employing coherent under-sampling to reduce the frequency requirement) and a scratchpad RAM as storage, the Haar wavelet can be implemented on-chip without significant area overhead. For example, the only computational devices needed are an adder, a subtractor, and a shifter. The key element here is whether the wavelet methods can work in conjunction with delay-line techniques, thus avoiding the sampling difficulties altogether. A combination of on-chip and ATE-based implementation is, of course, possible depending on the system test architecture and requirements.

The Morlet wavelet implementation (e.g., FIG. 13) described herein may be implemented within an instrument or an ATE as a signal-processing algorithm operating on sampled data. An on-chip implementation is rather challenging considering the nature of the integral in equation (5) but if successful, it would have the great advantage of avoiding the problems in RF sampling.

An alternative is to use a set of digital filter banks to process the transform discretely, which is commonly done in standard wavelet applications. The on-chip implementation of a digital filter bank involves design, power, and overhead considerations for each specific product or system.

A fourth advantage is applicability to signals at ever-higher frequencies and lower amplitudes, without significant modifications. The capabilities of wavelets to extract a signal feature of interest using dilation and translation are unmatched by most other signal processing techniques. As frequencies get higher or amplitudes get lower, the scale levels need to be adjusted appropriately to extract the desired parameters.

As for the Haar wavelet, non-stationary statistics such as pattern-dependent jitter in communication signals can be analyzed without any change in the basic algorithms. The Morlet transform, as shown in the above example embodiments of the present invention, is an excellent tool to analyze pattern-dependent or time-dependent phase jitter in RF signals and to study non-stationary statistics of frequency-hopping communication systems. This capability is simply not available in the regular FFT or other transforms frequently employed in test applications.

It should be pointed out that a blind application of wavelets could lead to drastically wrong results. It seems that for digital timing measurements, a simple scale level 1 analysis using the Haar wavelet would be also sufficient since a square wave has clear discontinuities at signal edges. However, as illustrated above, real-life digital signals are mostly continuous and differentiable, contaminated with noise and some glitches but without frequent large discontinuities. A direct one-scale analysis would lead to very large errors in jitter estimation in this case. To extract timing parameters from these signals, a good understanding of the signal characteristics and of the wavelet is indispensable. Moreover, since jitter is inherently a noise effect, any noise measurement technique, including wavelets, must take into account the probable noise characteristics to guarantee accurate extraction.

Embodiments of the present invention may be implemented using hardware, software, or a combination thereof. In implementations using software, the software may be stored on a machine-accessible medium.

A machine-accessible medium includes any mechanism that provides (i.e., stores and/or transmits) information in a form accessible by a machine (e.g., a computer, network device, personal digital assistant, manufacturing tool, any device with a set of one or more processors, etc.). For example, a machine-accessible medium includes recordable and non-recordable media (e.g., read only memory (ROM), random access memory (RAM), magnetic disk storage media, optical storage media, flash memory devices, etc.), as well as electrical, optical, acoustic, or other form of propagated signals (e.g., carrier waves, infrared signals, digital signals, etc.).

The above description of illustrated embodiments of the invention is not intended to be exhaustive or to limit embodiments of the invention to the precise forms disclosed. While specific embodiments of, and examples for, the invention are described herein for illustrative purposes, various equivalent modifications are possible, as those skilled in the relevant art will recognize. These modifications can be made in light of the above detailed description.

In the above description, numerous specific details, such as particular processes, materials, devices, and so forth, are presented to provide a thorough understanding of embodiments of the invention. One skilled in the relevant art will recognize, however, that the embodiments of the present invention can be practiced without one or more of the specific details, or with other methods, components, etc. In other instances, well-known structures or operations are not shown or described in detail to avoid obscuring the understanding of this description.

Reference throughout this specification to "one embodiment" or "an embodiment" means that a particular feature, structure, process, block, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed is:

1. A method, comprising:
   applying a discrete Haar wavelet or a discrete Morlet wavelet to a radio frequency (RF) signal under test;
   extracting at least one timing parameter from the RF signal using a wavelet transform of the RF signal, wherein the timing parameter includes a clock period of the RF signal; and
   presenting the clock period of the RF signal as a result of extracting the at least one timing parameter to characterize the RF signal.

2. The method of claim 1, further comprising extracting rise time for the RF signal.

3. The method of claim 1, further comprising extracting fall time for the RF signal.

4. The method of claim 1, further comprising extracting at least one frequency parameter from the RF signal.

5. The method of claim 4, further comprising extracting a frequency increase from the RF signal.

6. A method, comprising:
   computing scale level 1 coefficients as pairwise differences of samples of a radio frequency (RF) signal;
   computing scale level 1 coefficients as pairwise averages of the samples;
   searching for a local maxima and a local minima of the scale level 1 coefficients;
   computing time coordinates for the local maxima and minima of the scale level 1 coefficients;
   computing scale level 2 coefficients as pairwise differences of the scale level 1 averages;
   searching for local maxima and minima of the scale level 2 coefficients;

computing time coordinates for the local maxima and minima of the scale level 2 coefficients; and presenting the time coordinates for the local maxima and minima of the scale level 2 coefficients to characterize the RF signal.

7. The method of claim 6, further comprising correcting the time coordinates of the local maxima and minima of the scale level 2 coefficients.

8. The method of claim 6, further comprising computing a clock period for the RF signal by doubling a difference between time coordinates of two successive corrected local maxima and minima of the scale level 2 coefficients.

9. The method of claim 6, further comprising computing a clock period for the RF signal by subtracting time coordinates of two successive corrected local maxima of the scale level 2 coefficients.

10. The method of claim 9, further comprising computing jitter for the clock period.

11. The method of claim 6, further comprising computing a rise time of the RF signal by determining when the scale level 1 coefficients are negative.

12. The method of claim 6, further comprising computing a fall time of the RF signal by computing when the scale level 1 coefficients are positive.

13. A method, comprising:

computing scale level 1 coefficients samples of a radio frequency (RF) signal;

searching for local maxima and minima of the scale level 1 coefficients;

computing time coordinates for the local maxima and minima of the scale level 1 coefficients;

performing a polynomial best-fit function on the local maxima;

performing a polynomial best-fit function on the local maxima; and presenting the time coordinates for the local maxima and minima of the scale level 1 coefficients to characterize the RF signal.

14. The method of claim 13, further comprising extracting a phase discontinuity from the RF signal.

15. The method of claim 13, further comprising extracting a frequency variation from the RF signal.

16. A system, comprising:

a radio frequency (RF) signal source coupled to emit an RF signal; and a discrete Haar wavelet tool or a discrete Morlet wavelet tool coupled to apply a wavelet to the RF signal to extract a timing parameter from the RF signal using a wavelet transform of the RF signal, wherein the timing parameter includes a clock period of the RF signal.

17. The system of claim 16, wherein the wavelet tool is coupled to extract frequency characteristics from the RF signal.

18. The system of claim 16, wherein the wavelet tool is coupled to extract phase characteristics from the RF signal.

19. An article of manufacture, comprising:

a machine-accessible medium including data that, when accessed by a machine, cause the machine to perform the operations comprising:

applying a discrete Haar wavelet or a discrete Morlet wavelet to a radio frequency (RF) signal under test;

extracting at least one timing parameter from the RF signal using a wavelet transform of the RF signal, wherein the timing parameter includes a clock period of the RF signal; and presenting the at least one timing parameter to characterize the RF signal.

20. The article of manufacture of claim 19, wherein the machine-accessible medium further includes data that cause the machine to perform operations comprising extracting at least one timing parameter from the RF signal.

21. The article of manufacture of claim 19, wherein the machine-accessible medium further includes data that cause the machine to perform operations comprising extracting at least one frequency parameter from the RF signal.

22. The article of manufacture of claim 19, wherein the machine-accessible medium further includes data that cause the machine to perform operations comprising extracting at least one phase parameter from the RF signal.

23. An article of manufacture, comprising:

a machine-accessible medium including data that, when accessed by a machine, cause the machine to perform the operations comprising:

computing scale level 1 coefficients as pairwise differences of samples of a radio frequency (RF) signal;

computing scale level 1 coefficients as pairwise averages of the samples;

searching for a local maxima and a local minima of the scale level 1 coefficients;

computing time coordinates for the local maxima and minima of the scale level 1 coefficients;

computing scale level 2 coefficients as pairwise differences of the scale level 1 averages;

searching for local maxima and minima of the scale level 2 coefficients;

computing time coordinates for the local maxima and minima of the scale level 2 coefficients; and presenting the time coordinates for the local maxima and minima of the scale level 1 coefficients to characterize the RF signal.

24. The article of manufacture of claim 23, wherein the machine-accessible medium further includes data that cause the machine to perform operations comprising subtracting time coordinates of two successive corrected local maxima of the scale level 2 coefficients.

25. The article of manufacture of claim 23, wherein the machine-accessible medium further includes data that cause the machine to perform operations comprising determining when the scale level 1 coefficients are negative.

26. An article of manufacture, comprising:

a machine-accessible medium including data that, when accessed by a machine, cause the machine to perform the operations comprising:

computing scale level 1 coefficients samples of a radio frequency (RF) signal;

searching for local maxima and minima of the scale level 1 coefficients;

computing time coordinates for the local maxima and minima of the scale level 1 coefficients;

performing a polynomial best-fit function on the local maxima; and performing a polynomial best-fit function on the local maxima; and presenting the time coordinates for the local maxima and minima of the scale level 1 coefficients to characterize the RF signal.

27. The article of manufacture of claim 26, wherein the machine-accessible medium further includes data that cause the machine to perform operations comprising extracting a phase variation from the RF signal.

28. The article of manufacture of claim 26, wherein the machine-accessible medium further includes data that cause the machine to perform operations comprising extracting a frequency variation from the RF signal.

29. A method, comprising:
applying a wavelet to a radio frequency (RF) signal under test;
extracting at least one timing parameter from the RF signal using a wavelet transform of the RF signal, wherein the timing parameter includes a clock period of the RF signal;
extracting at least one phase parameter from the RF signal, wherein the phase parameter comprises a phase discontinuity; and
presenting the clock period of the RF signal as a result of extracting the at least one timing parameter to characterize the RF signal.

30. The method of claim 29, further comprising extracting jitter rate for the RF signal.

* * * * *